United States Patent
Shin

(10) Patent No.: US 9,628,904 B2
(45) Date of Patent: Apr. 18, 2017

(54) VOLTAGE CONTROL DEVICE FOR EAR MICROPHONE

(71) Applicant: HAEBORA CO., LTD., Seoul (KR)

(72) Inventor: Doo Sik Shin, Seoul (KR)

(73) Assignee: HAEBORA CO., LTD., Seoul (KR)

( * ) Notice: Subject to any disclaimer, the term of this patent is extended or adjusted under 35 U.S.C. 154(b) by 0 days.

(21) Appl. No.: 14/788,807

(22) Filed: Jul. 1, 2015

(65) Prior Publication Data

US 2015/0350759 A1 Dec. 3, 2015

Related U.S. Application Data

(62) Division of application No. 13/981,926, filed as application No. PCT/KR2011/008386 on Nov. 4, 2011, now Pat. No. 9,167,337.

(30) Foreign Application Priority Data

Jan. 28, 2011 (KR) .................. 10-2011-0008760
Apr. 21, 2011 (KR) .................. 10-2011-0037413
May 25, 2011 (KR) .................. 10-2011-0049421

(51) Int. Cl.
*H04R 29/00* (2006.01)
*H04R 1/28* (2006.01)
(Continued)

(52) U.S. Cl.
CPC ........ *H04R 1/2876* (2013.01); *H04M 1/6058* (2013.01); *H04M 9/082* (2013.01); *H04R 1/02* (2013.01); *H04R 1/08* (2013.01); *H04R 1/10* (2013.01); *H04R 1/1016* (2013.01); *H04R 1/1058* (2013.01); *H04R 1/1083* (2013.01);
(Continued)

(58) Field of Classification Search
CPC .......... H04R 1/2876; H04R 1/02; H04R 1/08; H04R 1/1016; H04R 1/1058; H04R 1/1083; H04R 3/00; H04R 3/02; H04R 19/04; H04R 2201/107; H04R 2410/03; H04M 1/6058; H04M 9/082
See application file for complete search history.

(56) References Cited

U.S. PATENT DOCUMENTS 6,173,056 B1 * 1/2001 Romesburg ............ H03G 3/007
379/406.01
7,983,433 B2 7/2011 Nemirovski
(Continued)

FOREIGN PATENT DOCUMENTS

KR 10-0540264 B1 12/2005
KR 10-2006-0129062 A 12/2006
KR 10-2008-0072323 A 8/2008

OTHER PUBLICATIONS

International Search Report for PCT/KR2011/008386 mailed Jun. 4, 2012 from Korean Intellectual Property Office.

*Primary Examiner* — Andrew L Sniezek
(74) *Attorney, Agent, or Firm* — Revolution IP, PLLC

(57) ABSTRACT

Disclosed is a voltage control device including a voltage detector detecting an output voltage output from an output port of a mobile communication device; and a voltage control circuit bypassing the output voltage to an earpiece in which a speaker and a microphone are integrally formed when the output voltage detected by the voltage detector is between a first voltage and a second voltage higher than the first voltage.

3 Claims, 15 Drawing Sheets

(51) Int. Cl.

| | | |
|---|---|---|
| *H04R 1/08* | (2006.01) | |
| *H04M 9/08* | (2006.01) | |
| *H04R 1/10* | (2006.01) | |
| *H04R 1/02* | (2006.01) | |
| *H04R 19/04* | (2006.01) | |
| *H04R 3/02* | (2006.01) | |
| *H04M 1/60* | (2006.01) | |
| *H04R 3/00* | (2006.01) | |

(52) U.S. Cl.
CPC ................ *H04R 3/00* (2013.01); *H04R 3/02* (2013.01); *H04R 19/04* (2013.01); *H04R 2201/107* (2013.01); *H04R 2410/03* (2013.01)

(56) References Cited

U.S. PATENT DOCUMENTS

| | | |
|---|---|---|
| 2008/0226090 A1 | 9/2008 | Seto et al. |
| 2010/0215198 A1 | 8/2010 | Ngia et al. |
| 2014/0177863 A1 | 6/2014 | Parkins |

\* cited by examiner

VOLTAGE CONTROL DEVICE FOR EAR MICROPHONE

CROSS REFERENCE TO PRIOR APPLICATIONS

This application is a Divisional Application of U.S. patent application Ser. No. 13/981,926 filed Jul. 26, 2013, which is a National Stage Application of PCT International Patent Application No. PCT/KR2011/008386 filed Nov. 4, 2011, which claims priority to Korean Patent Application Nos. 10-2011-0008760 filed Jan. 28, 2011, 10-2011-0037413 filed Apr. 21, 2011, and 10-2011-0049421 filed May 25, 2011, which are all hereby incorporated by reference in their entirety.

BACKGROUND

Embodiments according to the concept of the present invention relate to an ear microphone and a voltage control device, and in particular, to an ear microphone allowing a user to have a clear phone call with his/her counterpart even in a noisy environment, and a voltage control device for the ear microphone capable of maintaining a constant level of an output voltage output from an output port of a mobile communication device and thus removing echo and howling phenomena.

In general, the ear microphone is used to be worn on ears of a user while the ear microphone is coupled with an external apparatus such as sound equipment or a mobile phone as is done in a general earphone.

FIG. 1 illustrates a schematic configuration of a conventional ear microphone.

Referring to FIG. 1, the ear microphone consists of a connector 10 to be coupled with an external apparatus 1, and a main body 20 to be worn on ears of the user. The main body 20 is shaped to be inserted into the ear of the user and includes a speaker 22 outputting a voice signal and a microphone 23 converting the voice signal delivered through the external auditory meatus of the user into an electric signal and outputting the electric signal to the connector 10 in a surface facing the ear of the user.

In the case of the ear microphone, an external noise is introduced into the ear microphone to cause the echo or howling phenomenon to occur.

The levels of the output voltage output from the output port of the mobile communication device such as a mobile phone or a smartphone to the ear microphone jack are different depending on the kind of the mobile phone or the smartphone.

In addition, the levels of the output voltage output from the output port of the mobile communication device to the ear microphone jack are different even when the kinds of the mobile phone or the smartphone are identical to one another. Accordingly, the echo and howling phenomena may occur due to the difference in output voltage level when the user has a conversation with his/her counterpart using the microphone implemented in the ear microphone. In particular, the phenomena become worse in the ear microphone in which the speaker and the microphone are integrally formed.

SUMMARY

The present invention is to provide an ear microphone allowing the vibration noise within the ear microphone to be reduced and noise components such as the echo and howling occurring within the ear microphone to be removed, and a voltage control device for the ear microphone allowing the level of the output voltage output from the output port of the mobile communication device to be constantly maintained to remove the echo and howling that may occur when the speaker and the microphone are integrally formed and disposed in an earpiece.

The ear microphone according to embodiments of the present invention includes a microphone converting a voice signal into an electric signal, a speaker converting an electric signal into a voice signal, and a soundproof member in which the microphone and the speaker are disposed and a first penetrating groove and a second penetrating groove are included.

The soundproof member may include a first soundproof member and a second soundproof member, and an output terminal of the speaker and an input terminal of the microphone may be disposed in the first soundproof member toward the same direction.

The microphone may include a back hole, and the soundproof member may further include a third penetrating groove.

The third penetrating groove may include at least one penetrating groove.

The first soundproof member may include protrusions.

The second soundproof member may form a space A in which an electronic circuit is disposed.

The second soundproof member may form a space B in which an electric interconnection is disposed.

The second soundproof member may form a space C in which an electric interconnection connecting the speaker to the microphone is disposed outside the second soundproof member.

The ear microphone may further include a housing, and the housing may include a housing-separating film separating signals output from the speaker from signals input to the microphone.

The ear microphone may further include a cover, and the cover may include a cover-separating film separating signals output from the speaker from signals input to the microphone.

The housing-separating film and the cover-separating film may be "T"-shaped.

An ear microphone according to embodiments of the present invention includes an earphone unit including a first earphone unit having a microphone and a first speaker and a second earphone unit having a second speaker, and a control unit controlling the microphone, the first speaker, and the second speaker, wherein the microphone and the first speaker may be disposed in a first soundproof member, and the second speaker may be disposed in a second soundproof member.

The first soundproof member may include a front end soundproof member and a back end soundproof member, and an output terminal of the first speaker and an input terminal of the microphone are disposed in the front end soundproof member toward the same direction.

The first speaker may be a speaker outputting a high-note sound, and the second speaker may be a speaker outputting a low-note sound.

The first speaker may be a balanced-armature (BA) driver, and the second speaker may be a dynamic driver.

The first soundproof member may have a first penetrating groove and a second penetrating groove.

The microphone may include a back hole, and the first soundproof member may further include a third penetrating groove.

The first soundproof member may include protrusions.

The first earphone unit may further include a housing, and the housing may include a housing-separating film separating signals output from the first speaker from signals input to the microphone.

The first earphone unit may further include a cover, and the cover may include a cover-separating film separating signals output from the first speaker from signals input to the microphone.

A voltage control device for an ear microphone according to embodiments of the present invention includes a voltage detector detecting an output voltage output from an output port of a mobile communication device, and a voltage control circuit bypassing the output voltage to an earpiece in which a speaker and a microphone are integrally formed when the output voltage detected by the voltage detector is between a first voltage and a second voltage higher than the first voltage.

The voltage control circuit amplifies the output voltage to a voltage between the first and second voltages and supplies the amplified voltage to the earpiece when the detected output voltage is lower than the first voltage.

The voltage control circuit attenuates the output voltage to a voltage between the first and second voltages and supplies the attenuated voltage to the earpiece when the detected output voltage is higher than the second voltage.

A voltage control device for an ear microphone according to other embodiments of the present invention includes a voltage detector detecting an output voltage output from an output port of a mobile communication device and outputting a control code, a bypass circuit bypassing the output voltage to an earpiece in which a speaker and a microphone are integrally formed in accordance with the control code having a first code, an amplifying circuit amplifying the output voltage and transmitting the amplified voltage to the earpiece in accordance with the control code having a second code, and an attenuating circuit attenuating the output voltage and transmitting the attenuated voltage to the earpiece in accordance with the control code having a third code.

The voltage detector generates the control code having the first code when the output voltage detected by the voltage detector is between a first voltage and a second voltage higher than the first voltage, generates the control code having the second code when the detected output voltage is lower than the first voltage, and generates the control code having the third code when the detected output voltage is higher than the second voltage.

According to the ear microphone of embodiments of the present invention, the output terminal of the speaker and the input terminal of the microphone are disposed toward the same direction in the soundproof member within the ear microphone and the speaker and the microphone are separately disposed in the soundproof member, thereby reducing a vibration noise occurring in the ear microphone and suppressing echo and oscillation phenomena from occurring due to the signal output from the speaker and introduced to the input terminal of the microphone.

In addition, the soundproof member within the ear microphone can prevent external noises from being introduced.

In addition, the separating film can be formed on the cover and/or the housing of the ear microphone to block echo and howling phenomena, thereby enabling the user to have a clear telephone call.

In addition, a speaker reproducing a high-note sound can be employed for one earphone unit of the ear microphone and a speaker reproducing a low-note sound can be employed for the other earphone unit, thereby outputting a wide reproduction range of the sound.

In addition, the output terminal of the speaker and the input terminal of the microphone are disposed toward the same direction in the soundproof member within the ear microphone and the speaker and the microphone are separately disposed in the soundproof member, thereby reducing the vibration noise occurring in the ear microphone and suppressing the echo and oscillation phenomena from occurring due to the signal output from the speaker and introduced to the input terminal of the microphone.

In addition, the soundproof member within the ear microphone can prevent external noises from being introduced.

In addition, the separating film can be formed on the cover and/or the housing of the ear microphone to block the echo and howling phenomena, thereby enabling the user to have a clear telephone call.

According to the voltage control device for the ear microphone of embodiments of the present invention, the output voltage output from the output port of the mobile communication device can be maintained at a constant level, and the echo and howling that may occur when the speaker and the microphone are integrally formed can be reduced, thereby enhancing the call quality.

In addition, according to the voltage control device for the ear microphone of embodiments of the present invention, the ear microphone can control the output irrespective of the model of the mobile communication device, which can thus be applied to various mobile communication devices even with one development, and tuning is not required for the ear microphone, thereby shortening the development period of the mobile communication device.

BRIEF DESCRIPTION OF THE DRAWINGS

A detailed description of each drawing will be provided to more understand the drawings referred to in the detailed description of the present invention in which.

DETAILED DESCRIPTION

Figure 1:
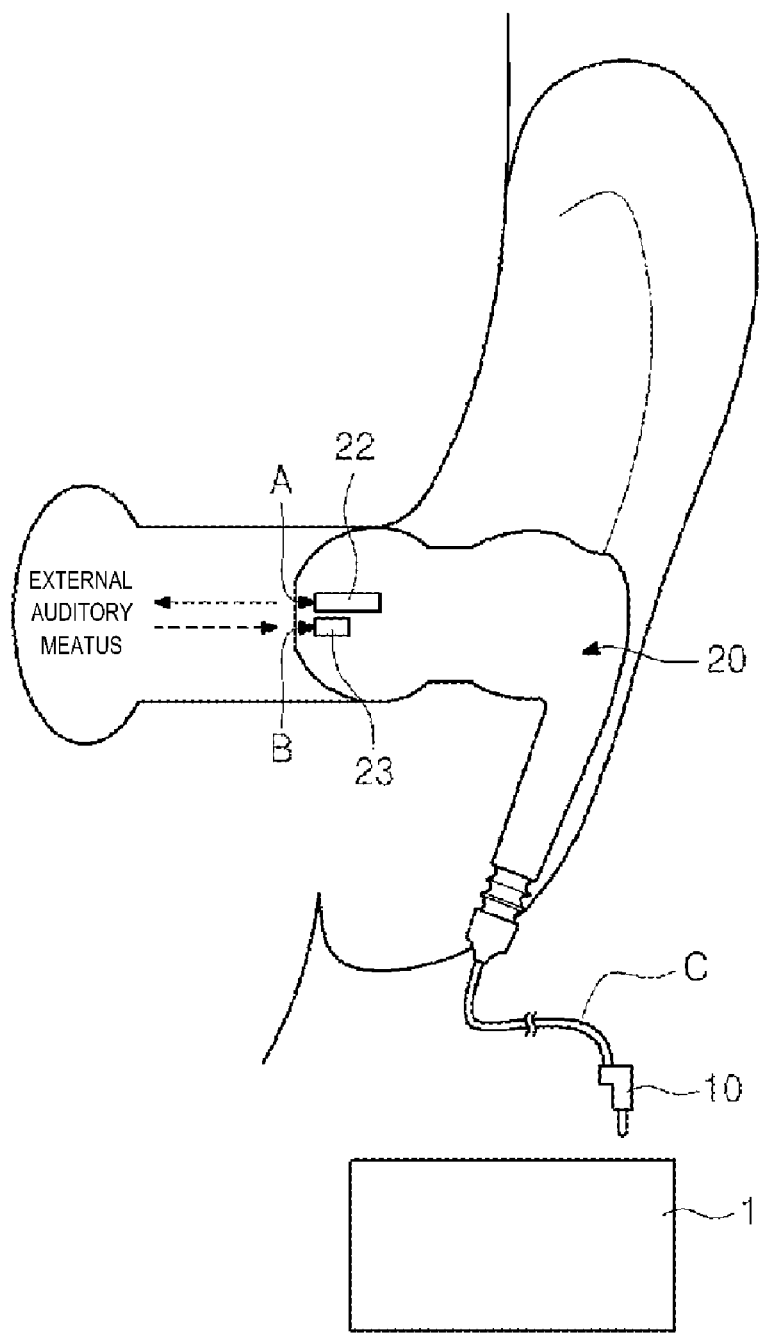
FIG. 1 is a view illustrating a schematic configuration of a conventional ear microphone.

Specific or functional description with respect to embodiments disclosed herein according to the concept of the present invention is intended to merely explain the embodiments according to the concept of the present invention, and the embodiments according to the concept of the present invention may be embodied in various forms and are not limited to the embodiments described herein.

Since various changes may be made and several forms may be embodied in the embodiments according to the concept of the present invention, the embodiments are intended to be illustrated in the drawings and described in detail herein. However, the embodiments according to the concept of the present invention are not limited to the specific embodiments set forth herein, and include all changes, equivalents, or substitutes included in the spirit and technical scope of the present invention.

While terms such as first or second may be used to describe various components, such components must not be limited to the above terms. The above terms are used only to distinguish one component from another. For example, a first component may be referred to as a second component and likewise a second component may be referred to as a first component without departing from the scope of rights according to the concept of the present invention.

When it is mentioned that one component is "connected" or "accessed" to another component, it may be understood that the one component is directly connected or accessed to another component or that still another component is interposed between the two components. In the meantime, when it is mentioned that one component is "directly connected" or "directly accessed" to another component, it may be understood that no component is interposed therebetween. Other expressions describing the relation between components, for example, "between" and "immediately between," or "adjacent to" and "directly adjacent to" should also be interpreted similarly.

Terms used herein are provided for merely explaining specific embodiments of the present invention, not limiting the invention. The singular forms "a", "an," and "the" are intended to include the plural forms as well, unless the context clearly indicates otherwise. It will be understood that the terms "comprises" or "has" when used in this specification, specify the presence of stated features, integers, steps, operations, elements, components, or a combination thereof, but do not preclude the presence or addition of one or more other features, integers, steps, operations, elements, components, or a combination thereof.

Unless otherwise defined, all terms used herein including technical or scientific terms are same as those generally understood by those skilled in the art. Terms such as those defined in the generally used dictionary should be interpreted as having the same meaning as that in terms of context in the related art, and are not interpreted as an ideal or excessively formal meaning unless clearly defined herein.

Hereinafter, the present invention will be described in detail by describing preferred embodiments of the present invention with reference to accompanying drawings.

Figure 2:
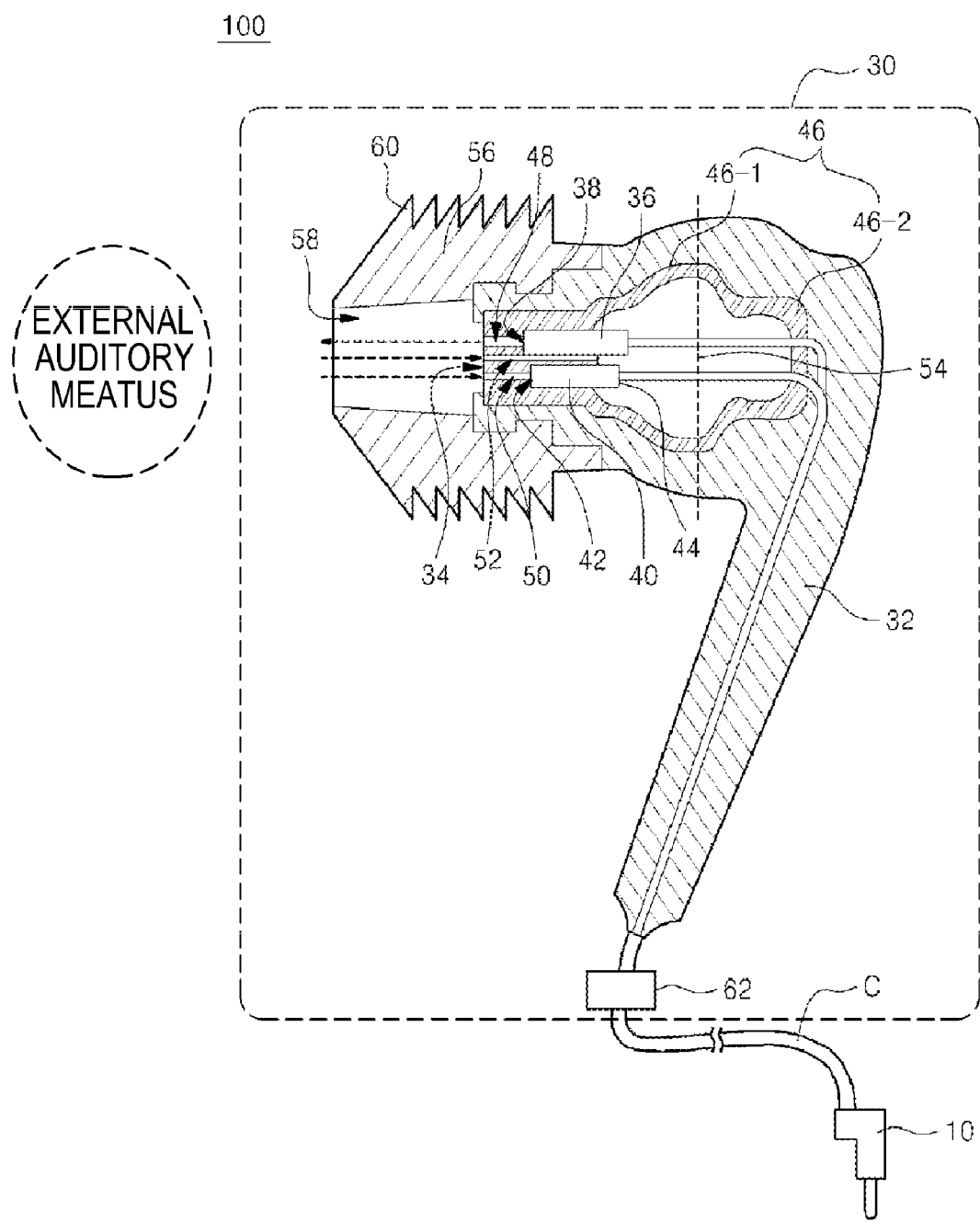
FIG. 2 is a view illustrating a configuration of an ear microphone according to an embodiment of the present invention.

FIG. 2 is a view illustrating a configuration of an ear microphone according to an embodiment of the present invention.

Referring to FIG. 2, the ear microphone 100 includes a connector 10 to be connected to an external apparatus (1 of FIG. 1), and a main body 30 shaped to be worn on an ear of a user. In this case, the connector 10 and the main body 30 are electrically connected via a cable C.

The main body 30 includes a housing 32 sized to be worn on the ear of the user. The housing 32 may have a nonlinear shape of which one end is bent. In addition, an opening 34 allowing a voice signal to be input thereto and output therefrom is formed in a surface of the housing 32 facing an external auditory meatus. A speaker 36 and a microphone 40 are disposed within the housing 32. In other embodiments, an additional speaker or an additional microphone may be included within the housing 32.

An output line of the microphone 40 is connected to a filter unit 62, and the filter unit 62 is connected to the connector 10. In this case, the output line of the microphone 40 is directly connected to the connector 10 when the filter unit 62 is not required.

The speaker 36 converts an electric signal provided from an external apparatus such as a mobile telephone via the connector 10 into a voice signal and outputs the voice signal. The voice signal output from an output terminal 38 of the speaker 36 is delivered to the external auditory meatus via a first penetrating groove 48 of a soundproof member 46, the opening 34 of the housing 32, and an opened groove 58 of a cover 56. In this case, the opening 34 of the housing 32 may be implemented as a plurality of grooves corresponding to the first penetrating groove 48, a second penetrating groove 50, and a third penetrating groove 52.

The microphone 40 converts the voice signal of the user provided via the external auditory meatus into an electric signal and outputs the electric signal to the filter unit 62.

In accordance with some embodiments, the microphone 40 may be implemented as a capacitor microphone including a back hole 44. The microphone 40 including the back hole has an effect of amplifying and outputting the voice signal of the user. In addition, the microphone 40 including the back hole has a bidirectional characteristic and a highly noise-resistant characteristic.

The speaker 36 and the microphone 40 are disposed in parallel to each other, and are fixed and supported within the housing 32 by the soundproof member 46 for supporting the speaker and the microphone. In this case, the output terminal 38 of the speaker 36 and the input terminal 42 of the microphone 40 are disposed toward the same direction. That is, the output terminal 38 of the speaker 36 is disposed toward the opening 34 of the housing 32, and the input terminal 42 of the microphone 40 is also disposed toward the opening 34 of the housing 32. In other words, the output terminal 38 of the speaker 36 and the input terminal 42 of the microphone 40 are disposed toward the surface facing the external auditory meatus.

The soundproof member 46 may be formed of a single layer or a plurality of layers. In addition, the soundproof member 46 may be formed of several separate parts to facilitate assembly of the ear microphone 100. That is, the soundproof member 46 may include a first soundproof member 46-1 in which the speaker 36 and the microphone 40 are disposed to the left and a second soundproof member 46-2 is disposed to the right with a cross-sectional surface 54 being a reference therebetween. In this case, a material of the soundproof member 46 may be any one of a sound-absorbing material, a plastic material, a rubber material, and a silicone material.

Hereinafter, the first soundproof member 46-1 and the second soundproof member 46-2 will be described in detail with reference to FIGS. 3 to 6.

The ear microphone 100 has a cover 56 disposed at an outside of the housing 32 toward the external auditory meatus for closely attaching the ear microphone 100 into the ear of the user. The cover 56 has a plurality of protrusions 60 externally formed thereon while surrounding a portion of the housing 32 toward the external auditory meatus and has an opening groove 58 in communication with the opening 34 of the housing 32 in the central portion of the cover. In this case, since the cover 56 is closely attached into the ear of the user, it may be formed of a soft material such as silicone having a close attachment property.

As described above, the voice signal is provided to the input terminal 42 of the microphone 40 via the external auditory meatus, the opening groove 58 of the cover 56, the opening 34 of the housing 32, and the second penetrating groove 50 of the soundproof member 46. In addition, the voice signal is provided to the back hole 44 of the microphone 40 via the third penetrating groove 52.

The filter unit 62 may receive an output signal of the microphone 40, and may remove a noise signal included in the received output signal of the microphone 40.

The ear microphone 100 may be implemented using a Bluetooth technique. In this case, the ear microphone 100 may not include the connector 10.

Figure 3:
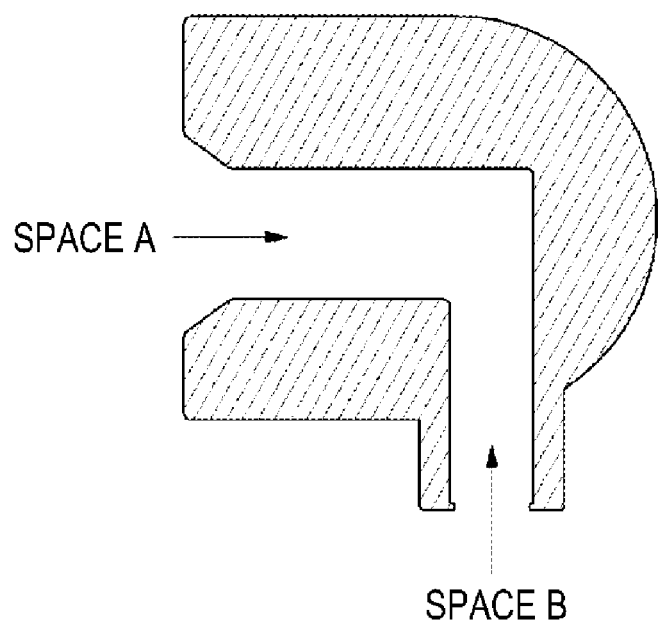
FIG. 3 is a view illustrating a second soundproof member according to a first embodiment of the present invention.

FIG. 3 is a view illustrating the second soundproof member according to a first embodiment of the present invention.

Referring to FIGS. 2 and 3, the second soundproof member 46-2 includes a space A and a space B therein. An electronic circuit designed to prevent an echo or howling phenomenon from occurring when the speaker 36 and the microphone 40 are close to each other may be received in the space A. In addition, an additional speaker or microphone for reducing an external noise may be disposed in the space A if needed. The space B may be used as a path for disposing electric interconnections for the speaker 36, the microphone 40, the electronic circuit, or the like.

As described above, the space A within the second soundproof member 46-2 may be utilized to make the ear microphone 100 clear in appearance.

Figure 4:
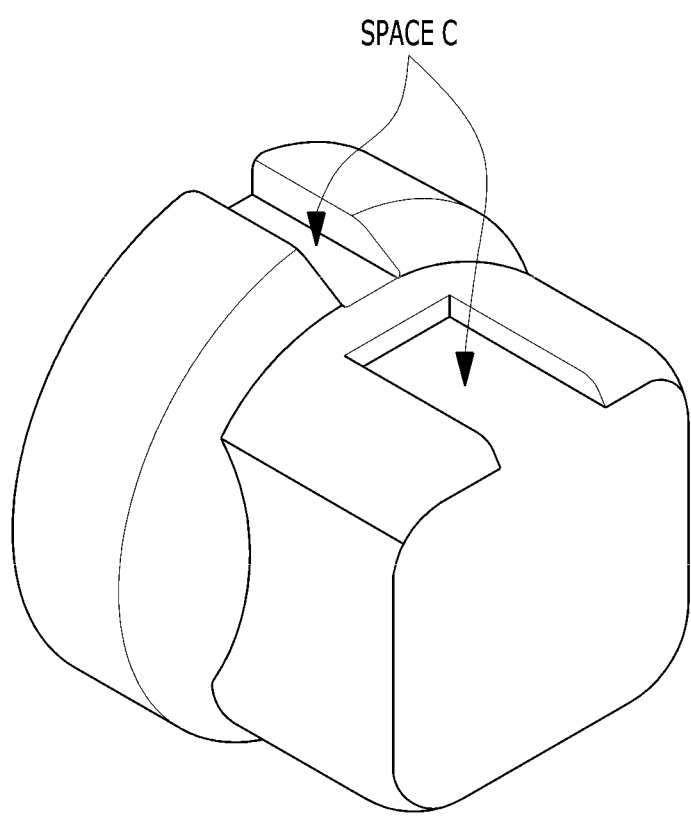
FIG. 4 is a view illustrating a second soundproof member according to a second embodiment of the present invention.

FIG. 4 is a view illustrating the second soundproof member according to the second embodiment of the present invention.

Referring to FIGS. 2 and 4, the second soundproof member 46-2 has a space C in which an electric intercon-nection between the speaker 36 and the microphone 40 is disposed outside the second soundproof member 46-2 as compared to the first embodiment.

As described above, the second soundproof member 46-2 may be designed as in the second embodiment to enhance the effect of suppressing the noise that may be introduced into the speaker 36 and the microphone 40.

Figure 5:
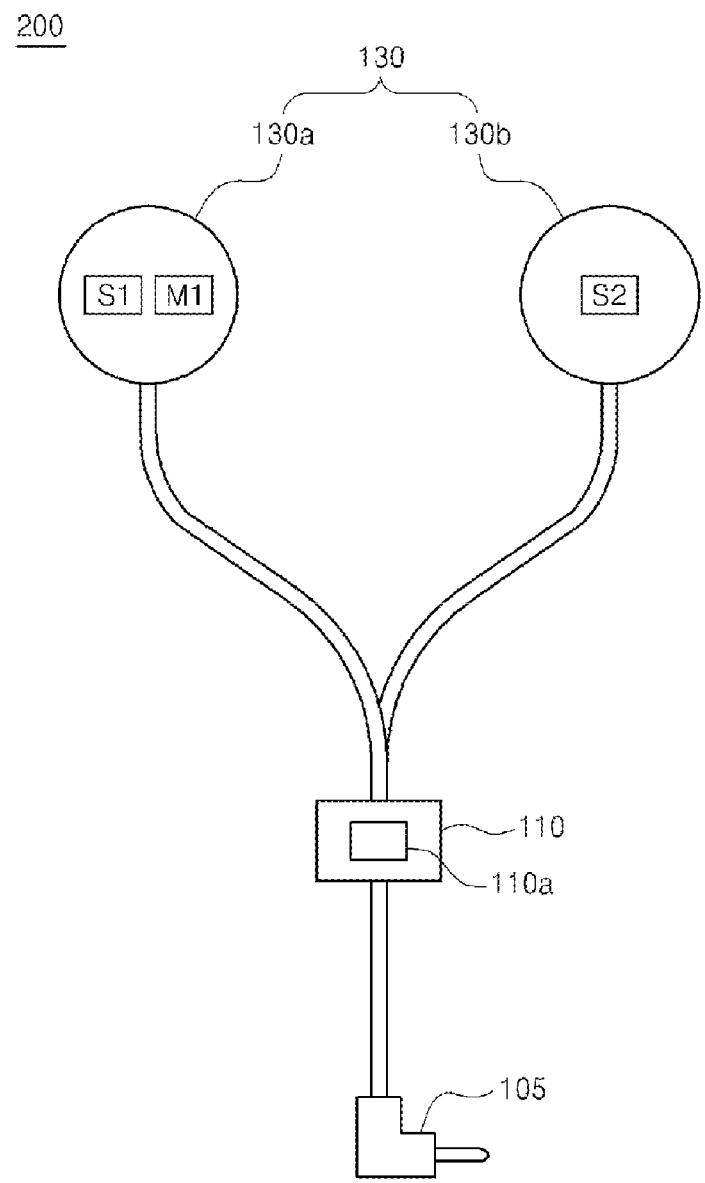
FIG. 5 is a view illustrating a wired ear microphone according to an embodiment of the ear microphone of the present invention.

FIG. 5 is a view illustrating a wired ear microphone as an ear microphone according to an embodiment of the present invention.

Referring to FIG. 5, the wired ear microphone 200 includes a connector 105 to be connected to an external apparatus, a control unit 110 setting a use mode of the wired ear microphone 200 and controlling general operations of the wired ear microphone 200, and an earphone unit 130 worn on the ears of the user and performing voice output or voice input processing.

In this case, the earphone unit 130 consists of a first earphone unit 130a and a second earphone unit 130b to be worn on both ears of the user. A first speaker S1 and a microphone M1 are disposed in the first earphone unit 130a, and a second speaker S2 is disposed in the second earphone unit 130b. That is, the voice signal provided from the external apparatus is transmitted to the ears of the user via the first and second speakers S1 and S2 disposed in the first and second earphone units 130a and 130b, respectively. The voice signal of the user is delivered to the microphone M1 via the external auditory meatus of the ear and provided to the external apparatus.

In this case, the first earphone unit 130a includes the first speaker S1 and the microphone M1 that are integrally formed, and the second earphone 130b includes the second speaker S2. For example, the first speaker S1 is a BA driver, and the second speaker S2 is a dynamic driver.

The BA driver capable of reproducing a high-note sound and having a smaller size than that of the dynamic driver may be employed for the first earphone 130a because both of the microphone M1 and the first speaker S1 of the first earphone unit 130a needs to be inserted into the ear. The dynamic driver may be employed for the second earphone unit 130b in order to reproduce a low-tone band and decrease the production cost.

In addition, the control unit 110 may further include a mode selection unit 110a for selecting a listening mode or a communication mode, that is, a service provided in connection with the external apparatus coupled with the connector 105. That is, the control unit 110 performs transmission and receipt on signals input from the microphone M1 and signals output through the first and second speakers S1 and S2 in accordance with the mode selected by the mode selection unit 110a.

The microphone M1 of the first earphone unit 130a amplifies the signal provided from the ear of the user, converts it into an electric signal, and then provides the electric signal to the external apparatus.

In addition, for example, the wired ear microphone 200 may further include a volume adjustment unit and a telephone conversation button unit, and the first earphone unit 130a may further include a filter unit for impedance-matching with the external apparatus.

Hereinafter, the BA driver and the dynamic driver serving as the first speaker S1 and the second speaker S2 will be described in detail.

The BA driver is a kind of a transducer in which the horseshoe-shaped armature is wrapped around by coils to reproduce the sound by means of a diaphragm using an electromagnetic field generated between permanent magnets, and the diaphragm is formed of a metallic material. That is, when an AC current is applied to the coils, the opposite arm (disposed within the magnetic field) moves toward the positive electrode of the magnet and vibrates as the current changes. This vibration is delivered to the diaphragm usually formed of a very thin metallic foil. The BA driver is characterized in that it can be manufactured with a small size and has good high-frequency reproduction ability and sensitivity because the diaphragm itself is extremely light as compared to the dynamic driver in which the coils are attached to the diaphragm. In addition, since the BA driver usually does not have a partial vibration occurring when the lead of the coil is attached to the bottom surface of the diaphragm, it has a small value of second or higher order harmonic distortion to provide a clear tone and a good resolution. Due to these characteristics, the BA driver is much more expensive than the dynamic driver. The BA driver available in the present invention outputs the high-note sound to allow the sound range of about 100 Hz to about 22 kHz to be reproduced.

The dynamic driver operates in the same principle as the general loud speaker or the dynamic microphone. Coils attached to the diaphragm formed of a thin Mylar or a paper vibrate as the voltage within the magnetic field changes, which in turn makes the diaphragm vibrate to allow the change in air pressure nearby to be recognized as a sound. That is, the dynamic driver is a kind of a transducer in which the diaphragm connected to the central coil moving up and down within the magnetic field generated by the permanent magnets is employed to allow the electric signal to be converted into the voice signal by the vibration of the diaphragm. The dynamic driver available in the present invention outputs the low-note sound to allow the sound range of about 20 Hz to about 16 kHz to be reproduced.

Therefore, the transducers driven in different manners from each other are used as the respective first earphone unit 130a and the second earphone unit 130b to output notes different from each other, and the notes output from the wired ear microphone 200 of the present invention are thus widened. A piezoelectric driver using piezoelectric elements may also be employed instead of the BA driver outputting the high note.

Hereinafter, operations of the wired ear microphone 200 having the configuration described above will be described.

First, the electric signal provided from a mobile communication terminal while the connector 105 of the wired ear microphone 200 is coupled with the external apparatus such as the mobile communication terminal is provided to the first speaker S1 and the second speaker S2 of the wired ear microphone 200 through the connector 105 and the cable.

The earphone unit 130 converts the electric signal applied from the external apparatus (e.g., a mobile communication terminal, a radio set, a voice recognition device, or the like) into a voice signal or a sound signal, and then outputs the converted signal via the output terminal. In addition, the voice signal generated by the user is introduced into the space of the soundproof member via the opening groove of the cover, the opening of the housing, and the penetrating groove of the soundproof member from the external auditory meatus, and the voice signal delivered through the space is introduced into the input terminal of the microphone. The voice signal introduced into the input terminal of the microphone is then delivered to the external apparatus in a wired or wireless manner. Hereinafter, details thereof will be described with reference to FIG. 7.

Figure 6:
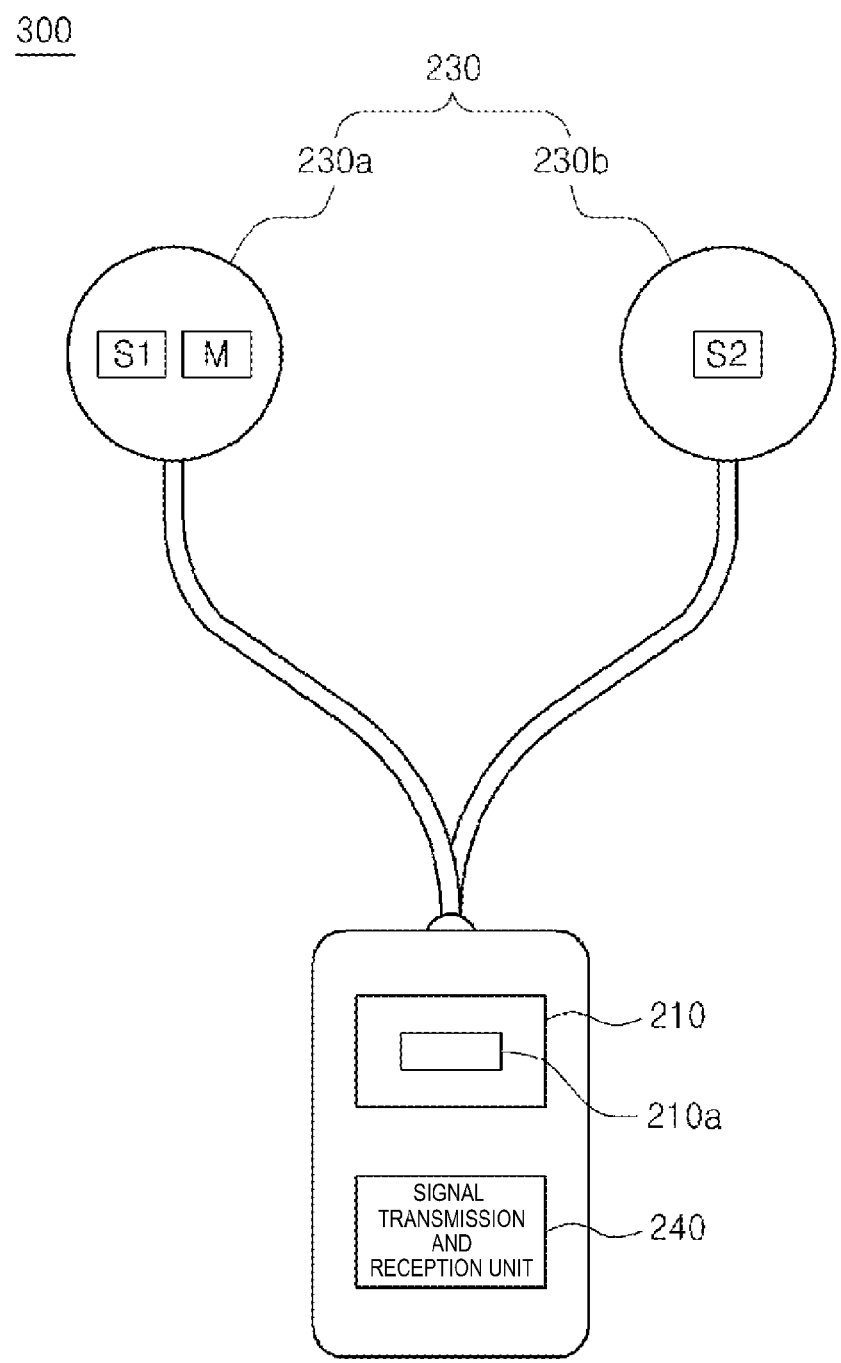
FIG. 6 is a view illustrating a wireless ear microphone according to another embodiment of the ear microphone of the present invention.

FIG. 6 is a view illustrating a wireless ear microphone according to another embodiment of the present invention.

Referring to FIGS. 5 and 6, the wireless ear microphone 300 has no connector 105 and includes a signal transmission and reception unit 240 transmitting and receiving signals with respect to an external side as compared to the wired ear microphone 200 of FIG. 1. In addition, the wireless ear microphone may further include a filter unit for impedance-matching.

A first earphone unit 230a, a second earphone unit 230b, a control unit 210, and a mode selection unit 210a included in the wireless ear microphone 300 are already described in detail as in the wired ear microphone 200, and the detailed description thereof will thus be omitted. However, the wireless ear microphone 300 is different from the wired ear microphone 200 in that the control unit 210 controls the signal transmission and reception unit 240 to transmit and receive the signal.

Figure 7:
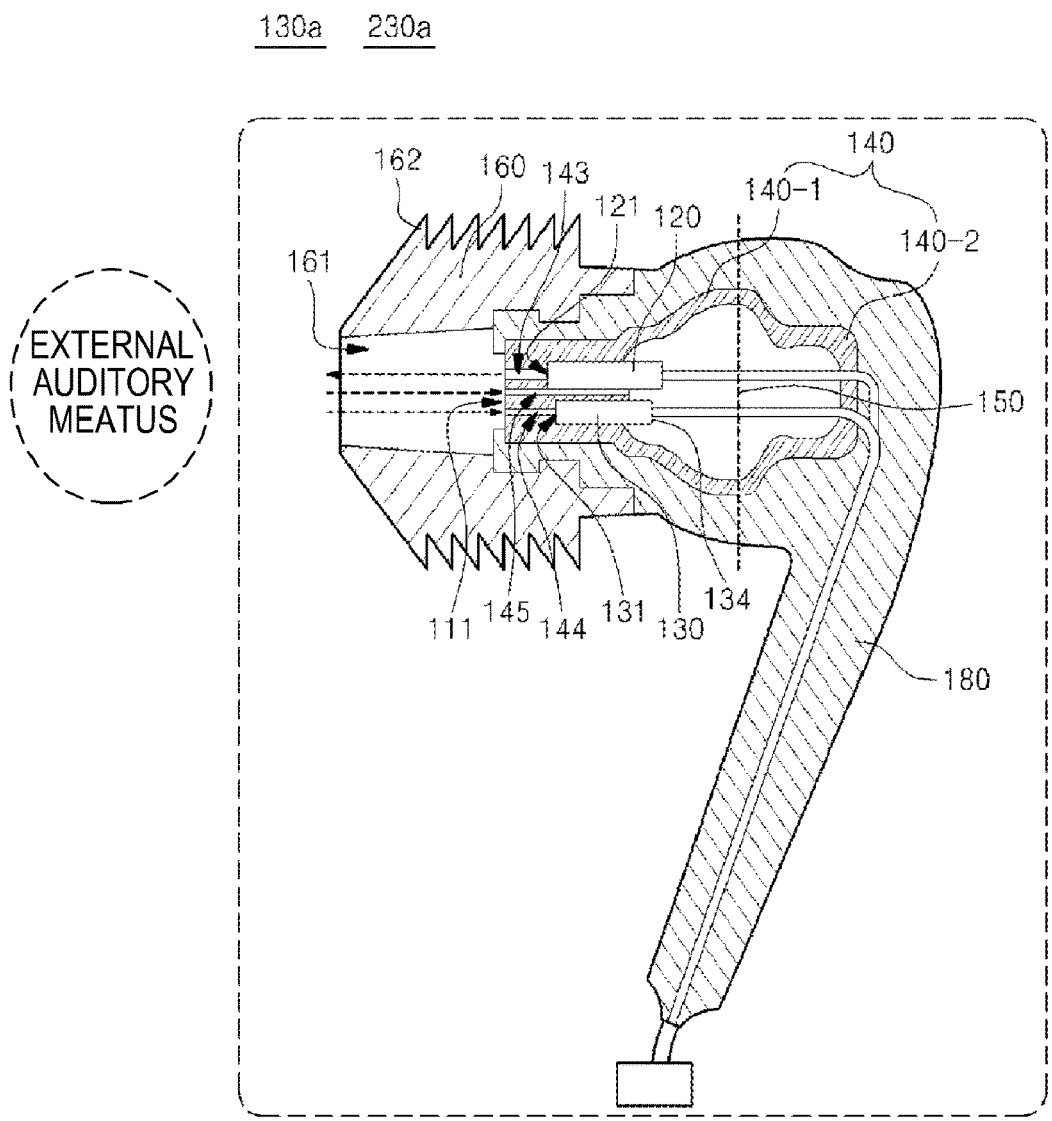
FIG. 7 is a view illustrating a first earphone unit according to an embodiment of the present invention.

FIG. 7 is a view illustrating the first earphone unit according to an embodiment of the present invention.

Referring to FIG. 7, the first earphone unit 130a or 230a includes a housing 180 sized to allow the housing to be inserted into the ear of the user. The housing 180 may have a nonlinear shape of which one side is bent. In addition, an opening 111 for inputting and outputting the voice signal is formed in a surface of the housing 180 facing the external auditory meatus.

In addition, the first earphone unit 130a or 230a includes a first speaker 120 for outputting the sound signal of a high note, and the first speaker 120 and the microphone 130 are positioned within the housing 180. The first speaker 120 converts the electric signal provided from the external apparatus such as a mobile telephone into the voice signal and then outputs the voice signal. The voice signal output from the output terminal 121 of the first speaker 120 is delivered to the external auditory meatus via the first penetrating groove 143 of the first soundproof member 140, the opening 111 of the housing 180, and the opening groove 161 of the cover 160. In this case, the opening 111 of the housing 180 may be implemented as a plurality of grooves corresponding to the first penetrating groove 143, the second penetrating groove 144, and the third penetrating groove 145.

The microphone 130 converts the voice signal of the user provided via the external auditory meatus into the electric signal and then outputs the electric signal. In some embodiments, the microphone 130 may be implemented as a capacitor microphone including a back hole 134. The microphone 130 including the back hole has an effect of amplifying and outputting the voice signal of the user. In addition, the microphone 130 including the back hole has a bidirectional characteristic and a highly noise-resistant characteristic.

The first speaker 120 and the microphone 130 are disposed in parallel to each other, and are fixed and supported within the housing 180 by the first soundproof member 140 for supporting the first speaker and the microphone. In this case, the output terminal 121 of the first speaker 120 and the input terminal 131 of the microphone 130 are disposed toward the same direction. That is, the output terminal 121 of the first speaker 120 is disposed toward the opening 111 of the housing 180, and the input terminal 131 of the microphone 130 is also disposed toward the opening 111 of the housing 180. In other words, the output terminal 121 of the first speaker 120 and the input terminal 131 of the microphone 130 are disposed toward the surface facing the external auditory meatus.

In this case, the soundproof member described with reference to FIG. 7 is the first soundproof member 140, which is intended to distinguish between the first soundproof member and a soundproof member that is a second soundproof member 350 at the time of describing the second earphone unit 130b with reference to FIG. 15. A description of FIG. 7 is also applied to FIG. 15 in terms of the material, structure, or the like of the soundproof member.

The first soundproof member 140 may be formed of a single layer or a plurality of layers. In addition, the first soundproof member 140 may be formed of several separate parts to facilitate assembly of the first ear microphone 130a. That is, the first soundproof member 140 may include a front end soundproof member 140-1 in which the first speaker 120 and the microphone 130 are disposed to the left and a back end soundproof member 140-2 disposed to the right with a cross-sectional surface 150 being a reference therebetween. In this case, a material of the first soundproof member 140 may be any one of a sound-absorbing material, a plastic material, a rubber material, and a silicone material.

The first earphone unit 130a has a cover 160 disposed at an outside of the housing 180 toward the external auditory meatus for closely attaching the first earphone unit 130a into the ear of the user. The cover 160 has a plurality of protrusions 162 externally formed while surrounding a portion of the housing 180 toward the external auditory meatus and has an opening groove 161 in communication with the opening 111 of the housing 180 in the central portion of the cover. In this case, since the cover 160 is closely attached into the ear of the user, it may be formed of a soft material such as silicone having a close attachment property. As described above, the voice signal is provided to the input terminal 131 of the microphone 130 via the opening groove 161 of the cover 160, the opening 111 of the housing 180, and the second penetrating groove 144 of the first soundproof member 140 from the external auditory meatus. In addition, the voice signal is provided to the back hole 134 of the microphone 130 via the third penetrating groove 145.

Figure 8:
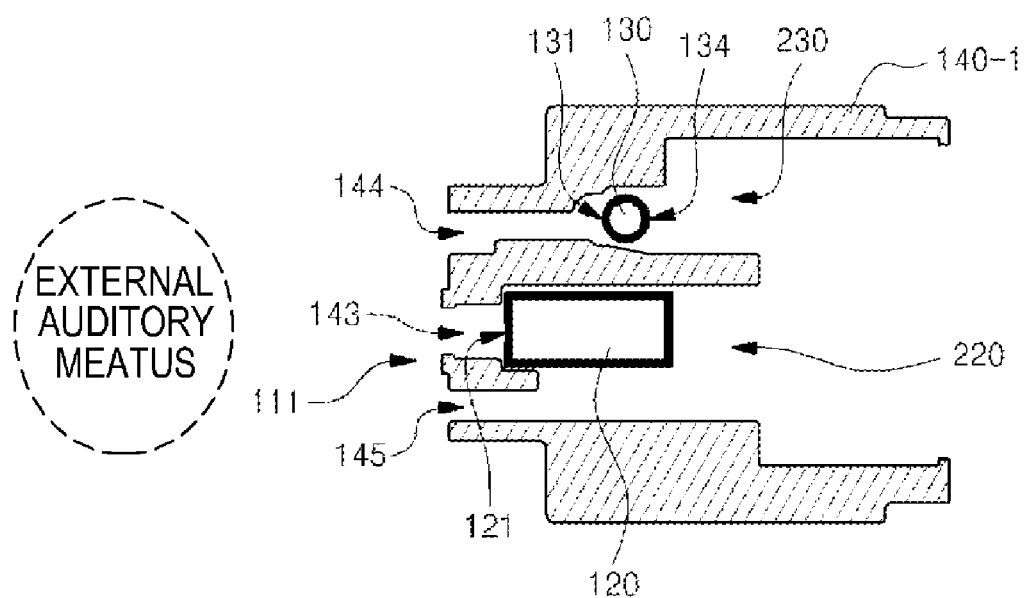
FIG. 8 is a view illustrating a front end soundproof member of a first soundproof member according to an embodiment of the present invention.

FIG. 8 is a view illustrating the front end soundproof member of the first soundproof member according to an embodiment of the present invention.

Referring to FIGS. 7 and 8, the front end soundproof member 140-1 includes a microphone-receiving groove 230 in which the microphone 130 is disposed and a first speaker-receiving groove 220 in which the BA driver 120 is disposed.

The front end soundproof member 140-1 has a second penetrating groove 144 connecting the microphone-receiving groove 230 to the opening 111 of the housing 180, and a first penetrating groove 143 connecting the first speaker-receiving groove 220 to the opening 111 of the housing 180 toward the external auditory meatus direction. In this case, the second penetrating groove 144 is a path for allowing the microphone 130 to transmit/receive the voice signal from an external side, and the first penetrating groove 143 is a path for allowing the first speaker 120 to transmit/receive the voice signal from the external side.

When the microphone 130 includes the back hole 134, the microphone may further include the third penetrating groove 145 as a path for allowing the voice signal output from the ear of the user to be input to the back hole 134 of the microphone 130 via the first speaker-receiving groove 220. In this case, since a position, a shape, a number of the third penetrating groove 145 may be changed depending on the design or need, the third penetrating groove 145 may be formed of at least one penetrating groove.

In other embodiments, when the microphone 130 does not include the back hole, another microphone as a second microphone (not shown) may be disposed within the first soundproof member 140 to use the third penetrating groove as a path for the voice signal output from the second microphone. However, when the microphone 130 does not include the back hole and the second microphone is not disposed within the first soundproof member 140, the front end soundproof member 140-1 may not have the third penetrating groove 145 because it does not require the third penetrating groove 145. In addition, positions of the first penetrating groove 143 and the third penetrating groove 145 may be changed in the BA driver-receiving groove 220.

Figure 9:
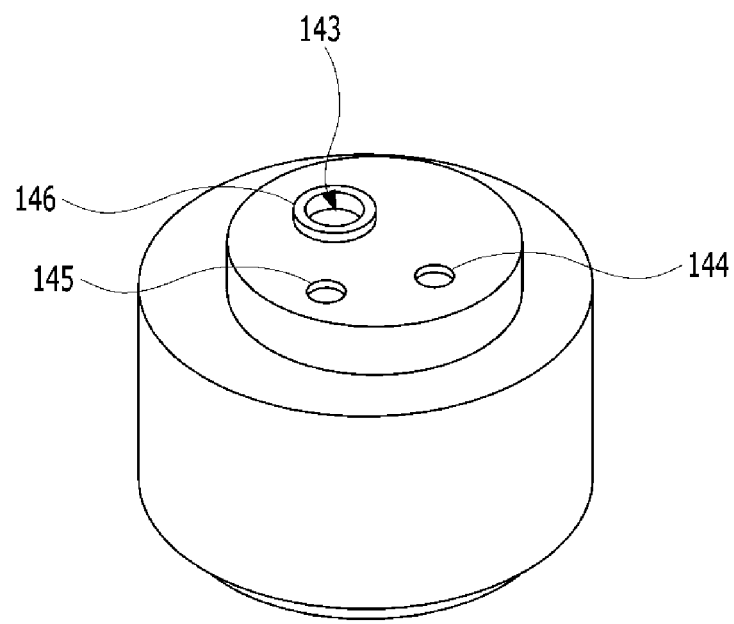
FIGS. 9 to 11 are a perspective view, a top view, and a bottom view of a front end soundproof member of the first soundproof member according to an embodiment of the present invention, respectively.
Figure 10:
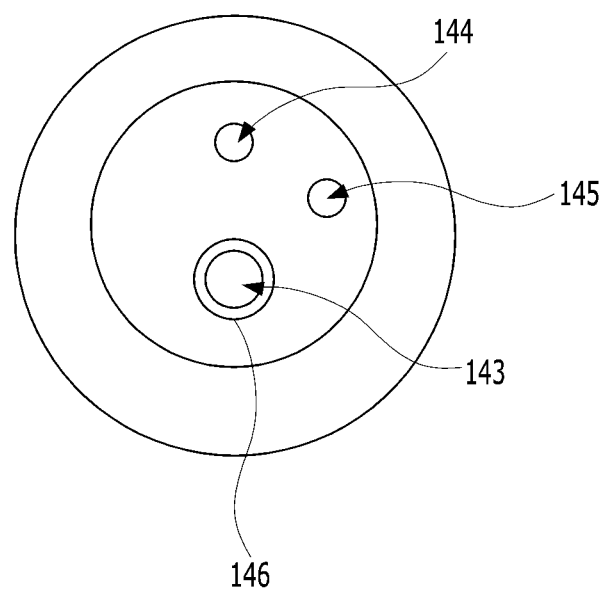
Figure 11:
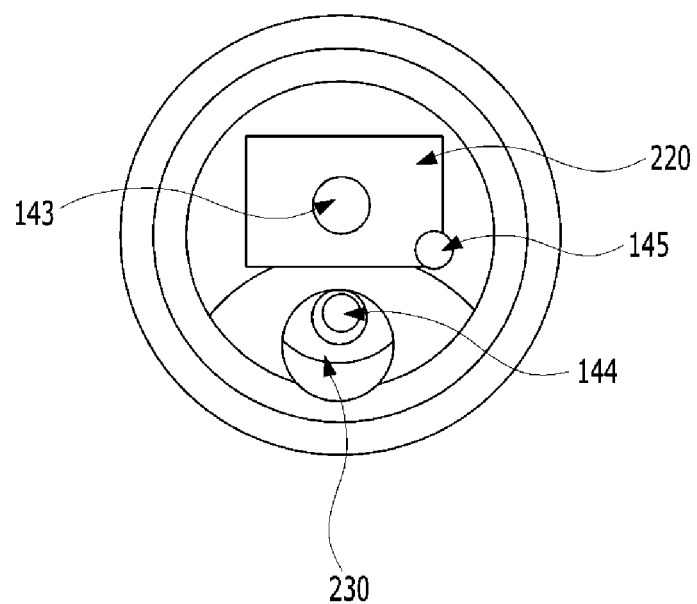

FIGS. 9 to 11 are a perspective view, a top view, and a bottom view of the front end soundproof member of the first soundproof member according to an embodiment of the present invention.

Referring to FIGS. 8 to 11, the front end soundproof member 140-1 may be recognized in a three-dimensional way. The front end soundproof member 140-1 may have a protrusion 146 outside the first penetrating groove 143. The protrusion 146 is closely attached and bonded to the penetrating groove of the first speaker 120 present in the housing 180.

Figure 12:
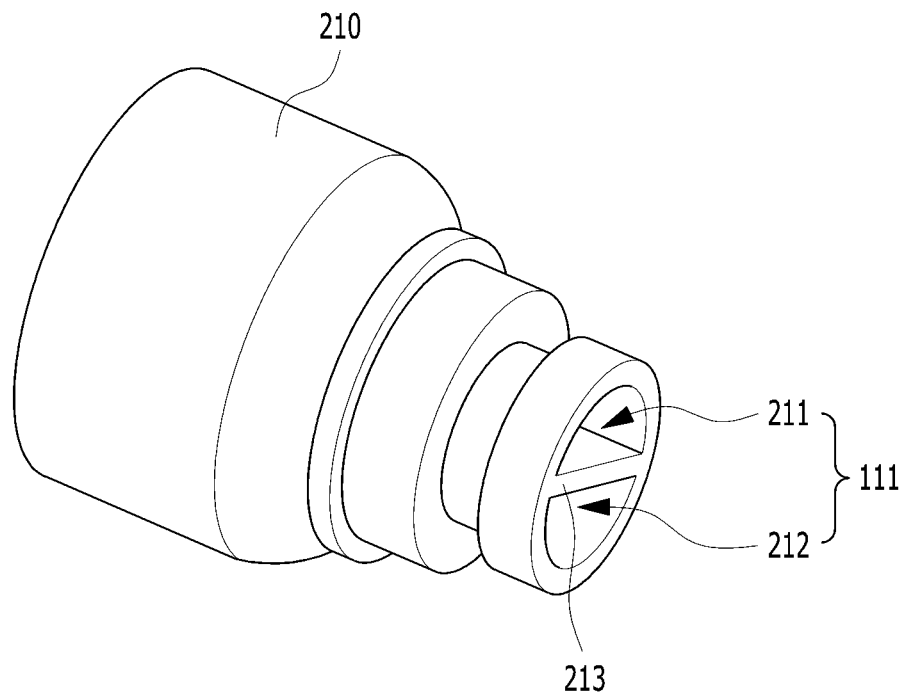
FIG. 12 is a view illustrating a portion of the housing according to an embodiment of the present invention.

FIG. 12 is a view illustrating a portion of the housing according to an embodiment of the present invention.

Referring to FIGS. 7 and 12, the housing includes a housing separating film 213 for separating the opening 111 of the portion of the housing 180 according to the present invention into a first speaker output signal opening 211 and a microphone 130 input signal opening 212. In other embodiments of the housing separating film 213, a T-shaped housing separating film 213 may be employed when the third penetrating film 145 exists.

This has an effect of allowing the housing separating film 213 to prevent the output signal of the speaker 120 from being delivered to the input of the microphone 130, thereby preventing the echo or oscillating phenomenon from occurring and enabling the user to have a clear telephone conversation even in a noisy environment.

Figure 13:
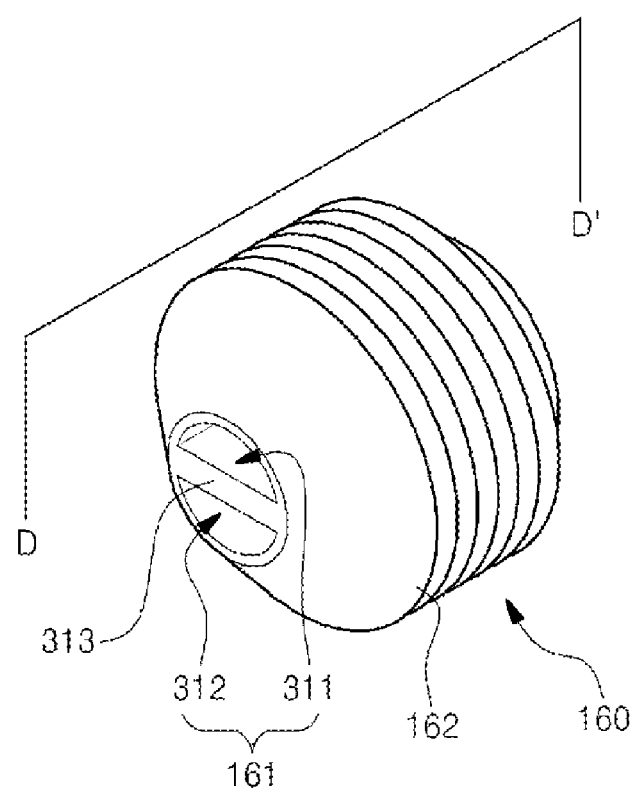
FIG. 13 is a view illustrating a cover according to an embodiment of the present invention.
Figure 14:
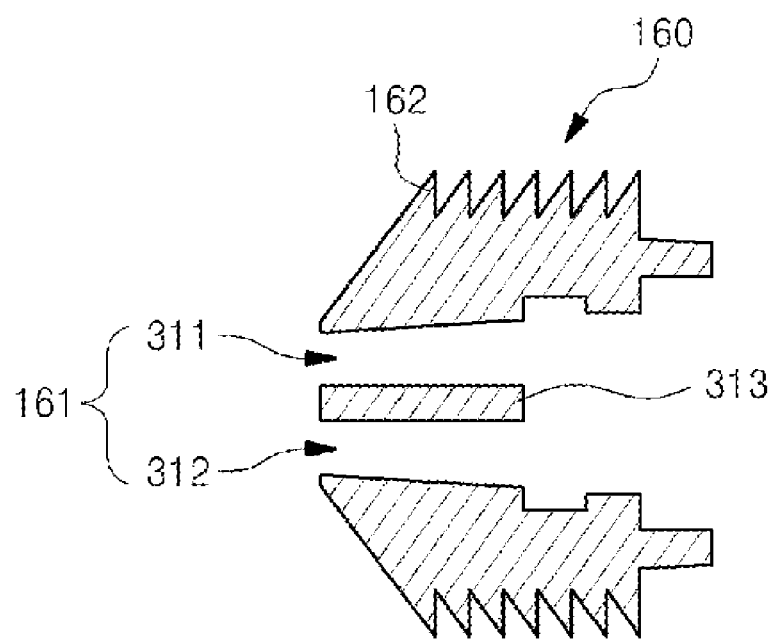
FIG. 14 is a cross-sectional view taken along line D-D' of the cover of FIG. 13.

FIG. 13 is a view illustrating a cover according to an embodiment of the present invention, and FIG. 14 is a cross-sectional view taken along line D-D' of the cover of FIG. 13.

Referring to FIGS. 13 and 14, the cover 160 of the present invention includes a cover separating film 313 for separation into the opening 311 of the first speaker 120 output signal and the opening 312 of the microphone 130 input signal. In other embodiments of the cover separating film 313, a T-shaped cover separating film 313 may be employed when the third penetrating film 145 exists.

In this case, since the cover 160 is closely attached into the ear of the user, it may be formed of a soft material such as silicone having a close attachment property.

The cover separating film 313 prevents the output signal of the speaker 120 from being directly delivered to the input of the microphone 130. Accordingly, when the user of the ear microphone 200 and 300 has a conversation with the counterpart on the phone, the cover separating film 313 has an effect of preventing the echo or oscillation phenomenon from occurring due to the output signal of the speaker 120 delivered to the input of the microphone 130.

In addition, the cover 160 has a plurality of protrusions 162 for preventing the external noise from being introduced into the housing. This allows the voice signal provided from the ear of the user not to be output outside and the earphone unit 130 to be closely attached into the ear and not to be easily fallen out of the ear even when the user is in exercise, thereby comfortably listening to the music and having a comfortable telephone conversation.

Figure 15:
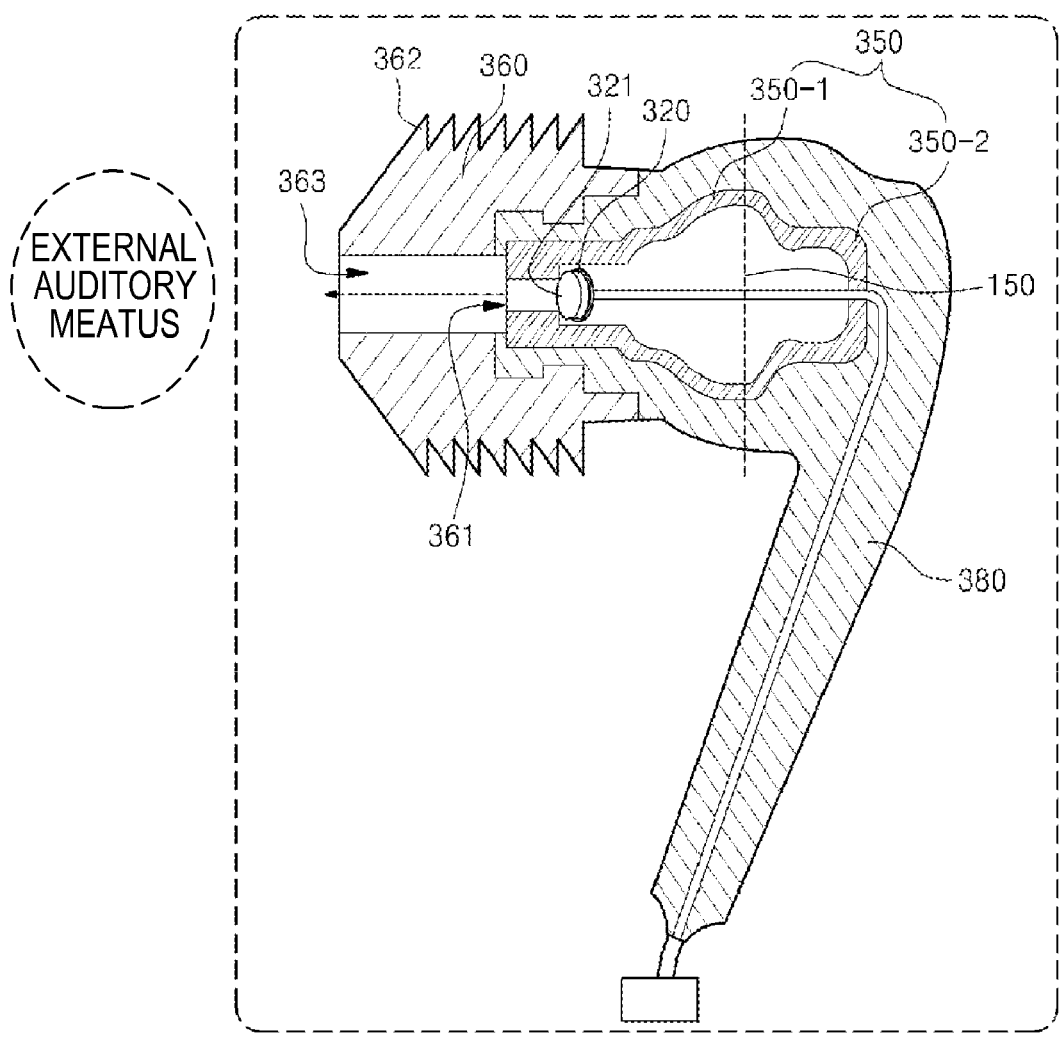
FIG. 15 is a view illustrating a second earphone unit according to an embodiment of the present invention.

FIG. 15 is a view illustrating the second earphone unit according to an embodiment of the present invention.

Referring to FIG. 15, the second earphone unit 130b of the present invention only has a second speaker 320 in the second soundproof member-receiving unit disposed within the "¬"-shaped housing 380 sized to be inserted into the ear. Accordingly, the second earphone unit 130b is configured to only output a low-note voice signal. In this case, an opening 361 of the housing for outputting the sound signal is disposed in a surface of the housing 380 facing the external auditory meatus.

The second speaker 320 converts the electric signal provided from the external apparatus into the sound signal and outputs the sound signal.

The second speaker 320 is fixed and supported within the housing 380 by the second soundproof member 350. In addition, a cover 360 is disposed at an outside of the housing 380 toward the external auditory meatus for being closely attached to the ear of the user. The cover 360 has a plurality of protrusions 362 externally formed while surrounding a portion of the housing 380 toward the external auditory meatus to prevent the external noise from being introduced thereto via the cover 360. An opening groove 363 is formed in communication with the opening 361 of the housing 380 in the central portion of the cover 360. In this case, since the cover 360 is closely attached into the ear of the user, it may be formed of a soft material such as silicone having a close attachment property.

Figure 16:
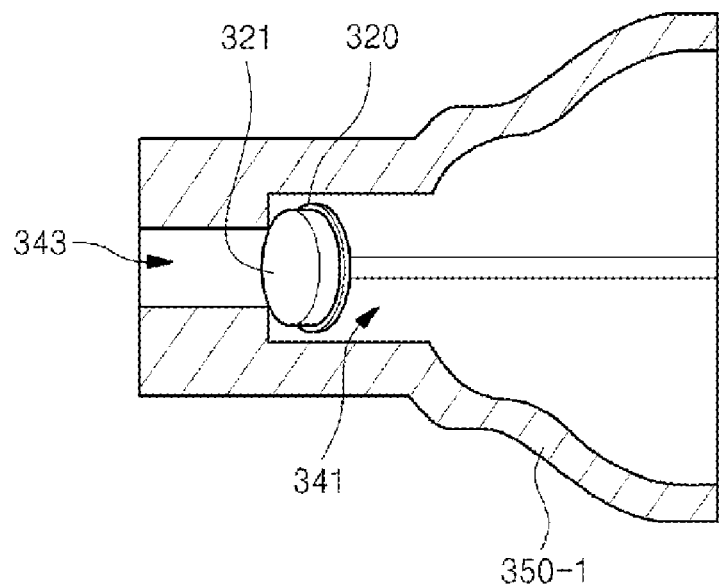
FIG. 16 is a view illustrating a front end soundproof member of a second soundproof member according to an embodiment of the present invention.

FIG. 16 is a view illustrating the front end soundproof member of the second soundproof member according to an embodiment of the present invention.

Referring to FIGS. 15 and 16, the front end soundproof member 350-1 of the second soundproof member 350 cylindrically has a stepped(stair) shape and has a second speaker-receiving groove 341 for allowing the second speaker 320 to be disposed therein. In this case, the second speaker-receiving groove 341 is intended to fix the second speaker 320 by means of the second soundproof member 350 in order to minimize the vibration due to the external wind or the mechanical vibration noise generated in the mechanism of the second earphone unit 130b. In addition, the second soundproof member 350 is used to prevent the external noise from being introduced into the second speaker 320 via the housing 380.

A fourth penetrating groove 343 for allowing the sound signal to be delivered to the external auditory meatus is formed at the bottom surface of the second speaker-receiving groove 341, that is, the central portion of the surface facing the external auditory meatus. The sound signal reproduced by the external apparatus is delivered to the external auditory meatus via the fourth penetrating groove 343, the housing 380, and the cover 360.

Figure 17:
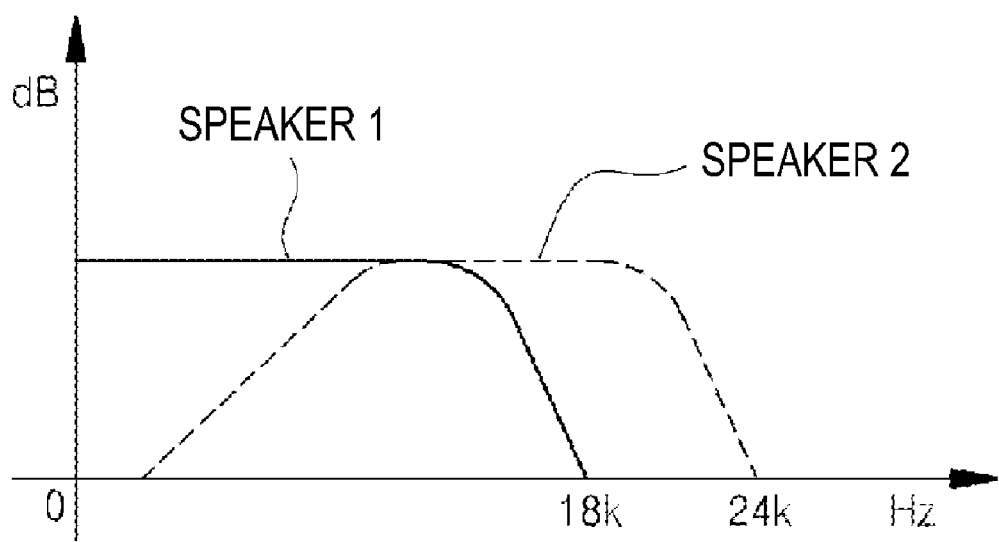
FIG. 17 is a view illustrating a sound frequency response curve output from a first speaker of a first earphone unit and a sound frequency response curve output from a second speaker of a second earphone unit according to an embodiment of the present invention.

FIG. 17 illustrates the sound frequency response curve output from the first speaker of the first earphone unit and the sound frequency response curve output from the second speaker of the second earphone unit in accordance with the present invention. In particular, the BA driver is employed as the first speaker, and the dynamic driver is employed as the second speaker.

Figure 18:
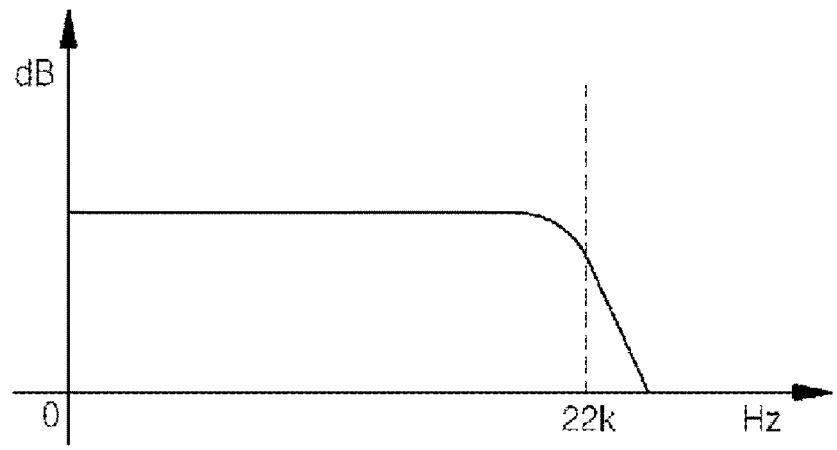
FIG. 18 is a view illustrating a frequency response curve of a sound heard by both ears of a user.

FIG. 18 is a view illustrating the frequency response curve of the sound heard by both ears of the user.

Referring to FIGS. 7, 15, and 18, the first speaker 120 used in the first earphone unit 130a of the present invention is a high-note driver capable of reproducing the note ranging from about 100 Hz to about 22 kHz, and the second speaker 320 used in the second earphone unit 130b is a low-note driver capable of reproducing the note ranging from about 20 kHz to about 16 kHz.

In the BA driver and the dynamic driver available in the ear microphones 200 and 300 of the present invention which are ear microphones that can be inserted into the ears, one sound source signal is delivered to each of the BA driver and the dynamic driver. However, the low-note sound is reproduced in the dynamic driver, and the high-note sound is reproduced in the BA driver.

As described above, when the low-note sound and the high-note sound are output via the different drivers, the sound of the overall output frequency widely ranging from about 20 Hz to about 22 kHz is advantageously delivered to the user as shown in FIG. 18.

Figure 19:
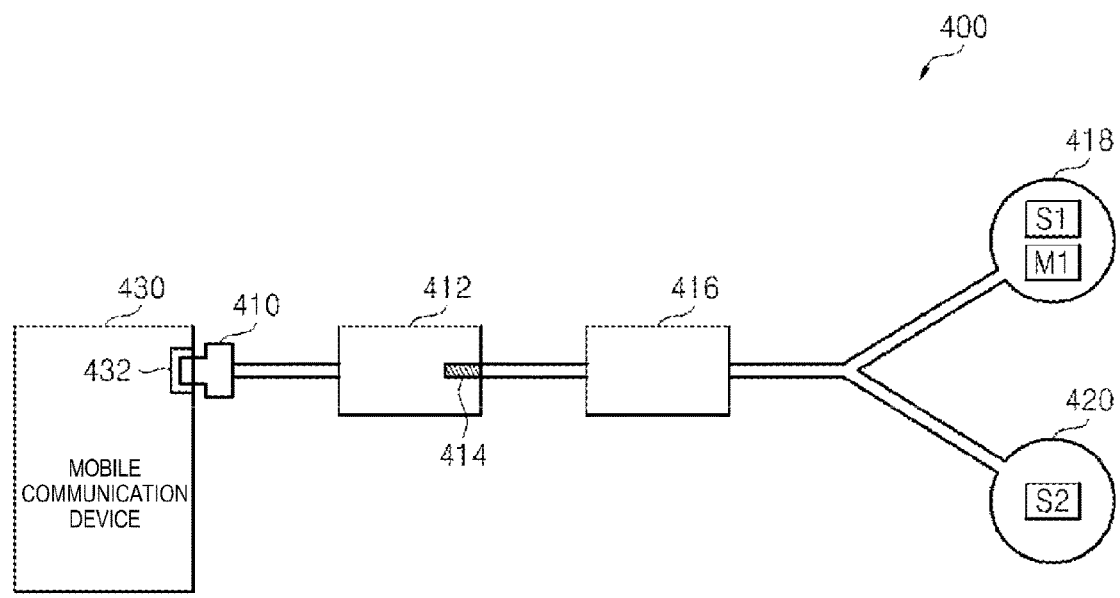
FIG. 19 illustrates an ear microphone including a voltage control device for the ear microphone according to an embodiment of the present invention.

FIG. 19 illustrates the ear microphone including the voltage control unit for the ear microphone according to an embodiment of the present invention. The ear microphone 400, the voltage control device 412 for the ear microphone, and the mobile communication device 430 are shown together for convenience of description in FIG. 19.

The mobile communication device 430 may be implemented as a mobile telephone, a smartphone, a tablet PC, a wireless set, or a personal digital assistant (PDA).

The ear microphone 400 includes a connector (or a jack 414), a control circuit (or a volume adjustment device 416), a first earpiece 418, and a second earpiece 420. Each of the earpieces 418 and 420 in the ear microphone 400 indicates the component to be inserted into each ear of the user.

The connector 414 of the ear microphone 400 may be electrically connected to the voltage control device 412 for the ear microphone. In addition, the connector (or jack 410) of the voltage control device 412 for the ear microphone may be electrically connected to the output port 432 of the mobile communication device 430.

Accordingly, the output voltage output from the output port 432 of the mobile communication device 430 (e.g., an output signal corresponding to the voice signal) may be transmitted to each of the earpieces 418 and 420 via the connector 410, the voltage control device 412 for the ear microphone, the connector 414, and the control circuit 416.

Although the voltage control device 412 for the ear microphone and the control circuit 416 are separated in the embodiment shown in FIG. 19, the voltage control device 412 for the ear microphone and the control circuit 416 may be integrated on one chip or separate chips and then implemented as one device.

The connector 414 may be connected to the voltage control device 412 for the ear microphone, and the control circuit 416 may adjust the signal output to the speakers S1 and S2 implemented in the respective earpieces 418 and 420 and output via the output port 432 of the mobile communication device 430, that is, the level of the voice signal such as the volume.

The first earpiece 418 includes the speaker S1 and the microphone M1. The microphone M1 may use the signal generating from the ear of the user as an input signal when the first earpiece 418 is inserted into the ear of the user and the user talks. The second earpiece 420 includes the speaker S2.

The voltage control device 412 for the ear microphone may maintain the constant level of the output voltage V output via the output port 432 of the mobile communication device 430 to reduce the echo and howling that may occur when the speaker S1 and the microphone M1 are integrally implemented, thereby enhancing the call quality of the mobile communication device 430.

Figure 20:
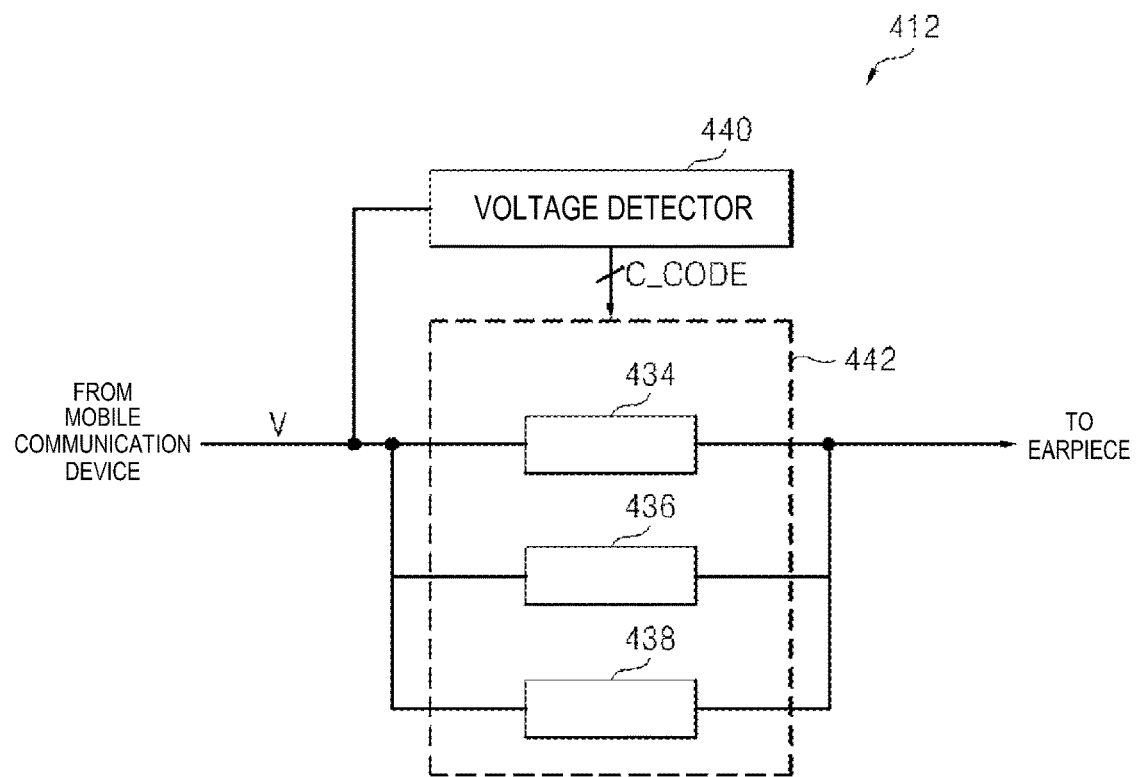
FIG. 20 is a block diagram illustrating the voltage control device for the ear microphone shown in FIG. 19.
Figure 21:
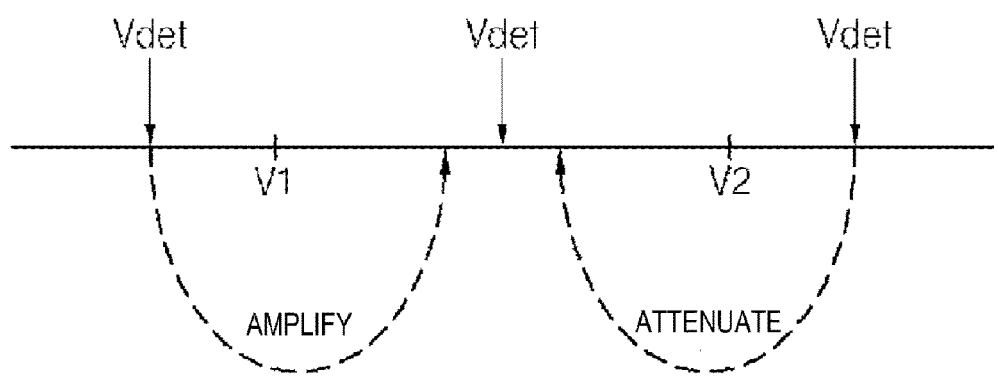
FIG. 21 is a conceptual diagram illustrating operations of the voltage control device for the ear microphone shown in FIG. 19.

FIG. 20 is a block diagram illustrating the voltage control device for the ear microphone shown in FIG. 19, and FIG. 21 is a conceptual diagram illustrating operations of the voltage control device for the ear microphone shown in FIG. 19.

Referring to FIGS. 19 to 21, the voltage control device 412 for the ear microphone includes a voltage detector 440 detecting the level of the output voltage V output from the output port 432 of the mobile communication device 430, and a voltage control circuit 442 including the first earpiece 418 in which the speaker S1 and the microphone M1 are integrally implemented and the second earpiece 420 having the speaker S2 and bypassing the output voltage V when the output voltage Vdet detected by the voltage detector 440 is between the first voltage V1 and the second voltage V2 higher than the first voltage V1 to the first and second earpieces.

The voltage control circuit 442 amplifies the output voltage output from the output port 432 when the detected output voltage Vdet is lower than the first voltage V1 to a voltage between the first voltage V1 and the second voltage V2 (e.g., increases the voltage level), and then supplies the amplified voltage to each of the earpieces 418 and 420.

The voltage control circuit 442 attenuates the output voltage output from the output port 432 when the detected output voltage V−Vdet is higher than the second voltage V2 to a voltage between the first voltage V1 and the second voltage V2 (e.g., decreases the voltage level), and then supplies the attenuated voltage to each of the earpieces 418 and 420.

In other words, the voltage detector 440 detects the level of the output voltage V output from the output port 432 of the mobile communication device 430, and outputs the control code C-CODE corresponding to the detected level. The control code C-CODE may include at least two bits or more.

For example, the voltage detector 440 generates the control code C-CODE having a first code when the detected output voltage Vdet is between the first voltage V1 and the second voltage V2 higher than the first voltage V1 (V1≤Vdet≤V2), generates the control code C-CODE having a second code when the detected output voltage Vdet is lower than the first voltage V1 (V1>Vdet), and generates the control code C-CODE having a third code when the detected output voltage Vdet is higher than the second voltage V2(Vdet>V2).

The voltage control circuit 442 includes a bypass circuit 434, an amplifying circuit 436, and an attenuating circuit 438.

The bypass circuit 434 bypasses the output voltage V output from the output port 432 to the first earpiece 418 in which the speaker S1 and the microphone M1 are integrally formed and bypasses the output voltage V to the second earpiece 420 in accordance with the control code C-CODE having the first code.

The amplifying circuit 436 amplifies the output voltage V output from the output port 432 and then supplies the amplified voltage to each of the earpieces 418 and 420 in accordance with the control code C-CODE having the second code.

The attenuating circuit 438 attenuates the output voltage V output from the output port 432 and then supplies the attenuated voltage to each of the earpieces 418 and 420 in accordance with the control code C-CODE having the third code.

Figure 22:
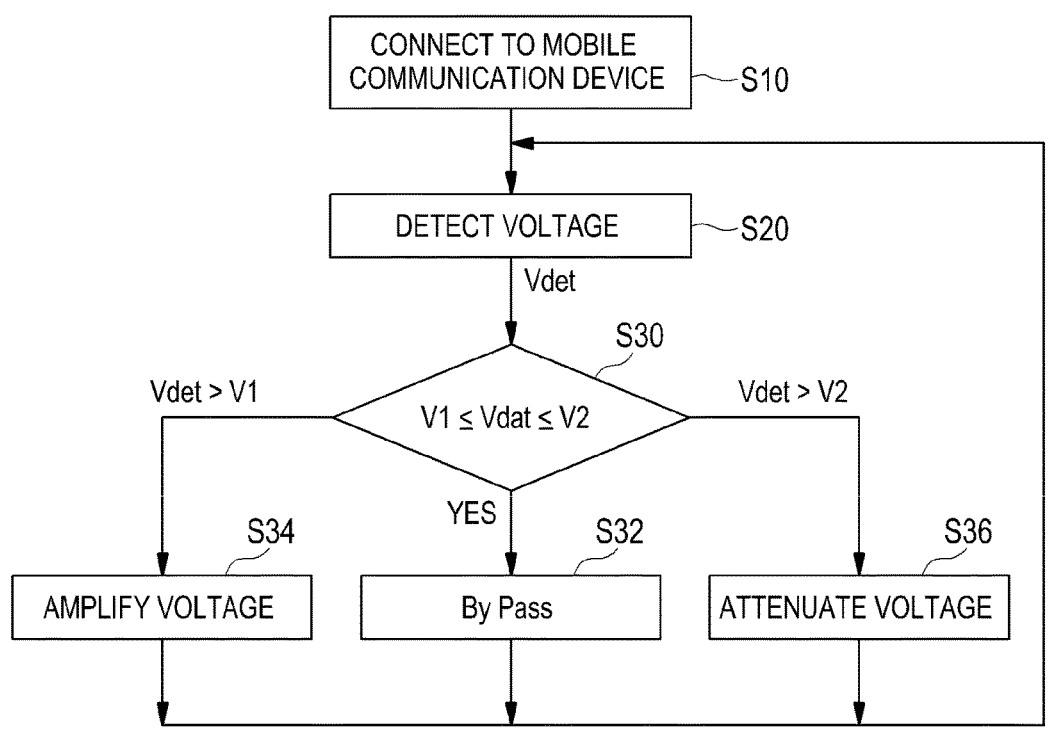
FIG. 22 is a flowchart illustrating operations of the voltage control device for the ear microphone shown in FIG. 19.

FIG. 22 is a flowchart illustrating operations of the voltage control device for the ear microphone shown in FIG. 19. Referring to FIGS. 19 to 22, the connector 410 of the voltage control device 412 for the ear microphone is connected to the output port 432 of the mobile communication device 430, and the connector 414 of the ear microphone 400 is connected to the voltage control device 412 for the ear microphone (S10).

The voltage detector 440 detects the level of the output voltage V output in the output port 432 of the mobile communication device 430 (S20).

The voltage detector 440 of the voltage control device 412 for the ear microphone determines whether the detected output voltage Vdet is between the first voltage V1 and the second voltage V2 (S30).

Since the voltage detector 440 generates the control code C-CODE having the first code when the detected output voltage Vdet is between the first voltage V1 and the second voltage V2 (V1≤Vdet≤V2), the bypass circuit 434 enabled by the control code C-CODE having the first code bypasses the output voltage V output from the output port 432 to each of the earpieces 418 and 420 (S32).

Since the voltage detector 440 generates the control code C-CODE having the second code when the detected output voltage Vdet is lower the first voltage V1 (V1>Vdet), the amplifying circuit 436 enabled by the control code C-CODE having the second code amplifies the output voltage V output from the output port 432 and then supplies the amplified voltage to each of the earpieces 418 and 420 (S34).

Since the voltage detector 440 generates the control code C-CODE having the third code when the detected output voltage Vdet is higher the second voltage V2 (Vdet>V2), the attenuating circuit 438 enabled by the control code C-CODE having the third code attenuates the output voltage V output from the output port 432 and then supplies the attenuated voltage to each of the earpieces 418 and 420 (S36).

Since the voltage detection operation of the voltage detector 440 is carried out in real time, the voltage control circuit 442 can always maintain the level of the output voltage V output via the output port 432 of the mobile communication device 430 at a voltage between the first voltage V1 and the second voltage (V1≤Vdet≤V2). Therefore, the echo and the howling that may occur in the first earpiece 418 in which the speaker S1 and the microphone M1 are integrally implemented can be removed.

While the present invention has been described with reference to embodiments illustrated in the drawings, it is to be understood that the foregoing embodiments are merely exemplary and various modifications or equivalent embodiments thereof may be made from the detailed description of the present invention by those skilled in the art. The true scope of the present invention should be determined by the technical spirit of the claims.

The present invention may be applied to the ear microphone and the voltage control device for the ear microphone.

What is claimed is:

1. A voltage control device for a wired ear microphone in which a speaker and a microphone are integrally formed, the voltage control device comprising:
   an input connector electrically connected to an output port of a mobile communication device;
   an output connector electrically connected to an input port of the wired ear microphone;
   a voltage detector detecting an output voltage output from the output port of the mobile communication device; and
   a voltage control circuit configured to:

amplify the output voltage to a voltage between a first voltage and a second voltage higher than the first voltage and supply the amplified voltage to the speaker when the detected output voltage is lower than the first voltage, and attenuate the output voltage to a voltage between the first voltage and the second voltage and supply the attenuated voltage to the speaker when the detected output voltage is higher than the second voltage.

2. The voltage control device for wired ear microphone of claim 1, wherein the voltage control circuit supplies the output voltage to the speaker when the output voltage detected by the voltage detector is between the first voltage and the second voltage.

3. The voltage control device for wired ear microphone of claim 1, wherein the voltage detector generates a control code based on a level of the detected output voltage, and the voltage control circuit amplifies or attenuates the output voltage based on the control code.

* * * * *